(12) United States Patent
Aikawa

(10) Patent No.: US 10,886,770 B2
(45) Date of Patent: Jan. 5, 2021

(54) DETERMINATION APPARATUS AND DETERMINATION METHOD

(71) Applicant: CANON KABUSHIKI KAISHA, Tokyo (JP)

(72) Inventor: Iori Aikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/684,343

(22) Filed: Nov. 14, 2019

(65) Prior Publication Data

US 2020/0161890 A1    May 21, 2020

(30) Foreign Application Priority Data

Nov. 19, 2018   (JP) ................................. 2018-216896

(51) Int. Cl.
*H04M 1/00* (2006.01)
*H02J 7/02* (2016.01)
*H02J 7/00* (2006.01)

(52) U.S. Cl.
CPC ........... *H02J 7/025* (2013.01); *H02J 7/00034* (2020.01)

(58) Field of Classification Search
CPC .. H02J 7/025; H02J 5/005; H02J 50/40; H02J 7/00034; H02J 50/70; H02J 7/0027; H04W 64/00; H04W 4/02; H04W 84/12; H04W 24/00; H04W 72/02
See application file for complete search history.

(56) References Cited

U.S. PATENT DOCUMENTS

| 2009/0224888 A1* | 9/2009 | Caruana ............. G06K 7/10178 340/10.2 |
| 2014/0140230 A1* | 5/2014 | Wen ...................... H04W 40/12 370/252 |
| 2014/0319924 A1* | 10/2014 | Jung ........................ H02J 5/005 307/104 |
| 2015/0270718 A1 | 9/2015 | Hwang |
| 2017/0063433 A1 | 3/2017 | Tanabe |

FOREIGN PATENT DOCUMENTS

| EP | 3193460 A1 | 7/2017 |
| JP | 2009-15574 A | 1/2009 |

\* cited by examiner

*Primary Examiner* — Nhan T Le
(74) *Attorney, Agent, or Firm* — Canon U.S.A., Inc. I.P. Division

(57) ABSTRACT

A determination apparatus includes a receiving unit that receives magnetic field information from an antenna unit configured to receive a magnetic field generated by a power transmitting apparatus that transmits power wirelessly; a determination unit that performs a determination process for determining whether a strength of the received magnetic field indicated by the magnetic field information is not greater than a predetermined reference value; and a communication unit that transmits data indicating a result of the determination process to the power transmitting apparatus.

15 Claims, 6 Drawing Sheets

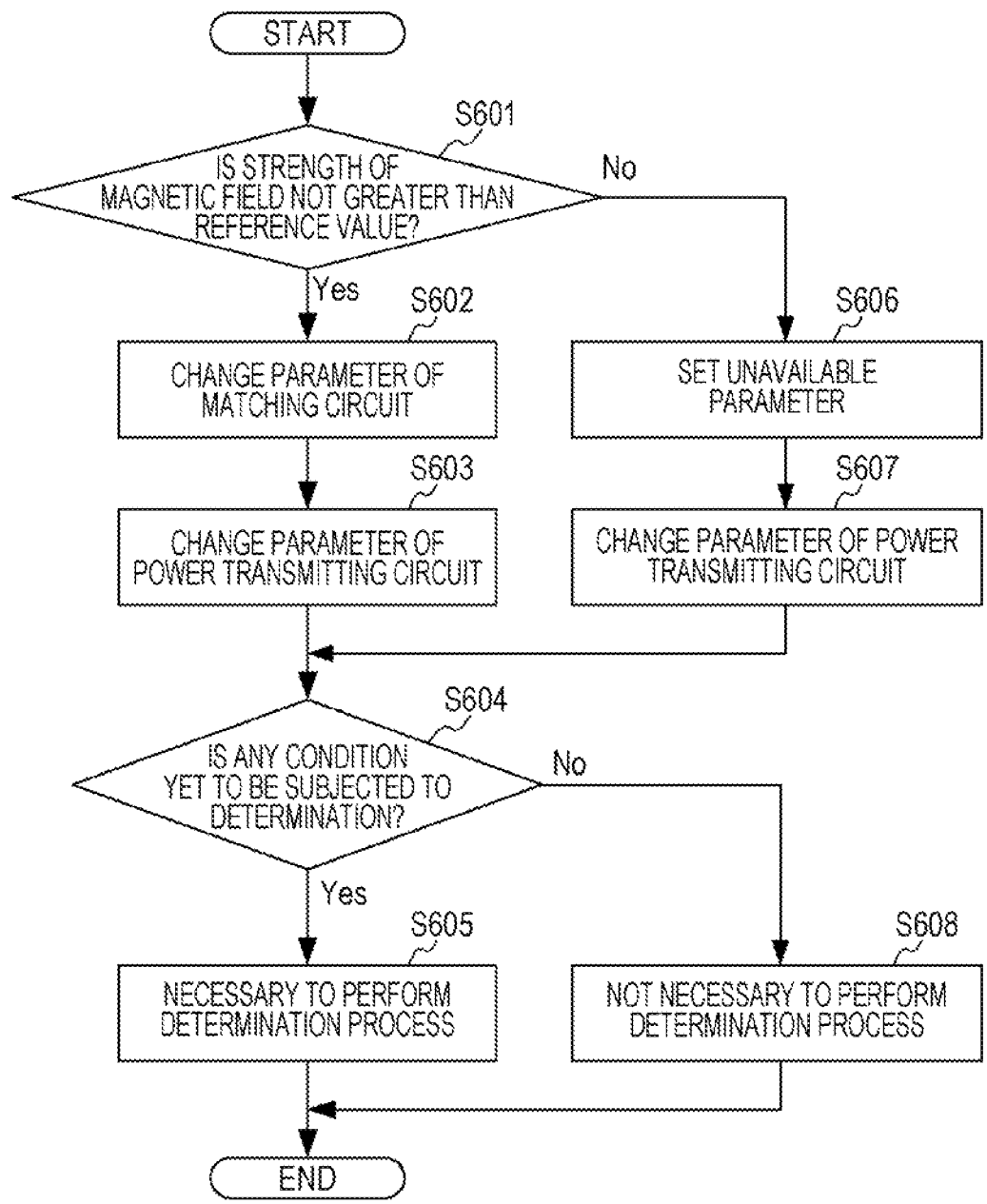

DETERMINATION APPARATUS AND DETERMINATION METHOD

BACKGROUND

Field of the Disclosure

Aspects of the disclosure generally relate to an apparatus and a method for determining the strength of magnetic field generated by a power transmitting apparatus.

Description of the Related Art

In recent years, a known wireless communication system includes a communication apparatus including an antenna that supplies power or signals wirelessly and an electronic device including an antenna that wirelessly receives power or signals supplied from the communication apparatus.

Japanese Patent Laid-Open No. 2009-15574 describes an inspection system that measures coupling characteristics of the antenna of the communication apparatus in such a wireless communication system.

SUMMARY

A power transmitting apparatus that can generate various strengths of magnetic field can generate various strengths of magnetic field depending on a power transmission status of the power transmitting apparatus. Without considering the variation of the strength of magnetic field generated by the power transmitting apparatus, if the measured strength of magnetic field exceeds a predetermined reference value, the inspection system may fail to operate correctly.

According to an aspect of the embodiments, an apparatus or a method can determine whether the strength of magnetic field generated by the power transmitting apparatus that can generate various strengths of magnetic field is not greater than the predetermined reference value.

According to an aspect of the embodiments, there is provided a determination apparatus including a receiving unit that receives magnetic field information from an antenna unit configured to receive a magnetic field generated by a power transmitting apparatus that transmits power wirelessly; a determination unit that performs a determination process for determining whether a strength of the received magnetic field indicated by the magnetic field information is not greater than a predetermined reference value; and a communication unit that transmits data indicating a result of the determination process to the power transmitting apparatus.

According to an aspect of the embodiments, there is provided a method including receiving magnetic field information from an antenna unit configured to receive a magnetic field generated by a power transmitting apparatus that transmits power wirelessly; performing a determination process for determining whether a strength of the received magnetic field indicated by the magnetic field information is not greater than a predetermined reference value; and transmitting data indicating a result of the determination process to the power transmitting apparatus.

According to an aspect of the embodiments, there is provided a non-transitory storage medium storing a program that causes a computer to execute a method, the method including receiving magnetic field information from an antenna unit configured to receive a magnetic field generated by a power transmitting apparatus that transmits power wirelessly; performing a determination process for determining whether a strength of the received magnetic field indicated by the magnetic field information is not greater than a predetermined reference value; and transmitting data indicating a result of the determination process to the power transmitting apparatus.

Further aspects of the embodiments will become apparent from the following embodiments.

BRIEF DESCRIPTION OF THE DRAWINGS

FIG. 6 is a flowchart illustrating an example of a change process according to the first embodiment.

DESCRIPTION OF THE EMBODIMENTS

Exemplary embodiments, features, and aspects of the disclosure will be described below with reference to the drawings. However, aspects of the disclosure are not limited to the following embodiments.

First Embodiment

Figure 1:
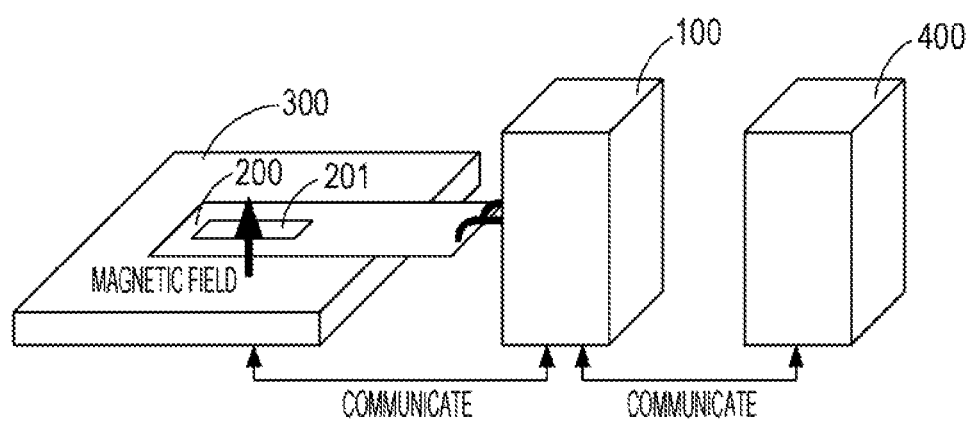
FIG. 1 illustrates an example of a determination system according to a first embodiment.

FIG. 1 illustrates an example of a determination system according to a first embodiment.

The determination system according to the first embodiment includes, for example, a determination apparatus 100, an antenna device 200, a power transmitting apparatus 300, and an output apparatus 400.

The power transmitting apparatus 300 generates a magnetic field in order to transmit power wirelessly. The power transmitting apparatus 300 may transmit power to a digital camera or a mobile phone or may transmit power to an automobile. In addition, the power transmitting apparatus 300 may transmit power wirelessly by electromagnetic induction or may transmit power wirelessly by magnetic resonance.

The antenna device 200 is used for measuring the strength of magnetic field generated by the power transmitting apparatus 300. The antenna device 200 measures the strength of magnetic field generated by the power transmitting apparatus 300 and transmits information indicating the measured strength of magnetic field to the determination apparatus 100. Hereinafter, the information indicating the strength of magnetic field measured by the antenna device 200 will be referred to as "magnetic field information".

The determination apparatus 100 determines whether the strength of magnetic field indicated by the magnetic field information received from the antenna device 200 is not greater than a predetermined reference value. In addition, the determination apparatus 100 transmits, to either one of the power transmitting apparatus 300 and the output apparatus 400, information indicating a determination result as to whether the strength of magnetic field indicated by the magnetic field information is not greater than the predetermined reference value. Furthermore, the determination apparatus 100 can receive information regarding the status of the power transmitting apparatus 300 from the power transmitting apparatus 300 and can transmit information for controlling the power transmitting apparatus 300 to the power transmitting apparatus 300. Hereinafter, the information indicating a determination result as to whether the strength of magnetic field indicated by the magnetic field information is not greater than the predetermined reference value will be referred to as "determination information".

The output apparatus 400 notifies a user of the determination information received from the determination apparatus 100.

Figure 2:
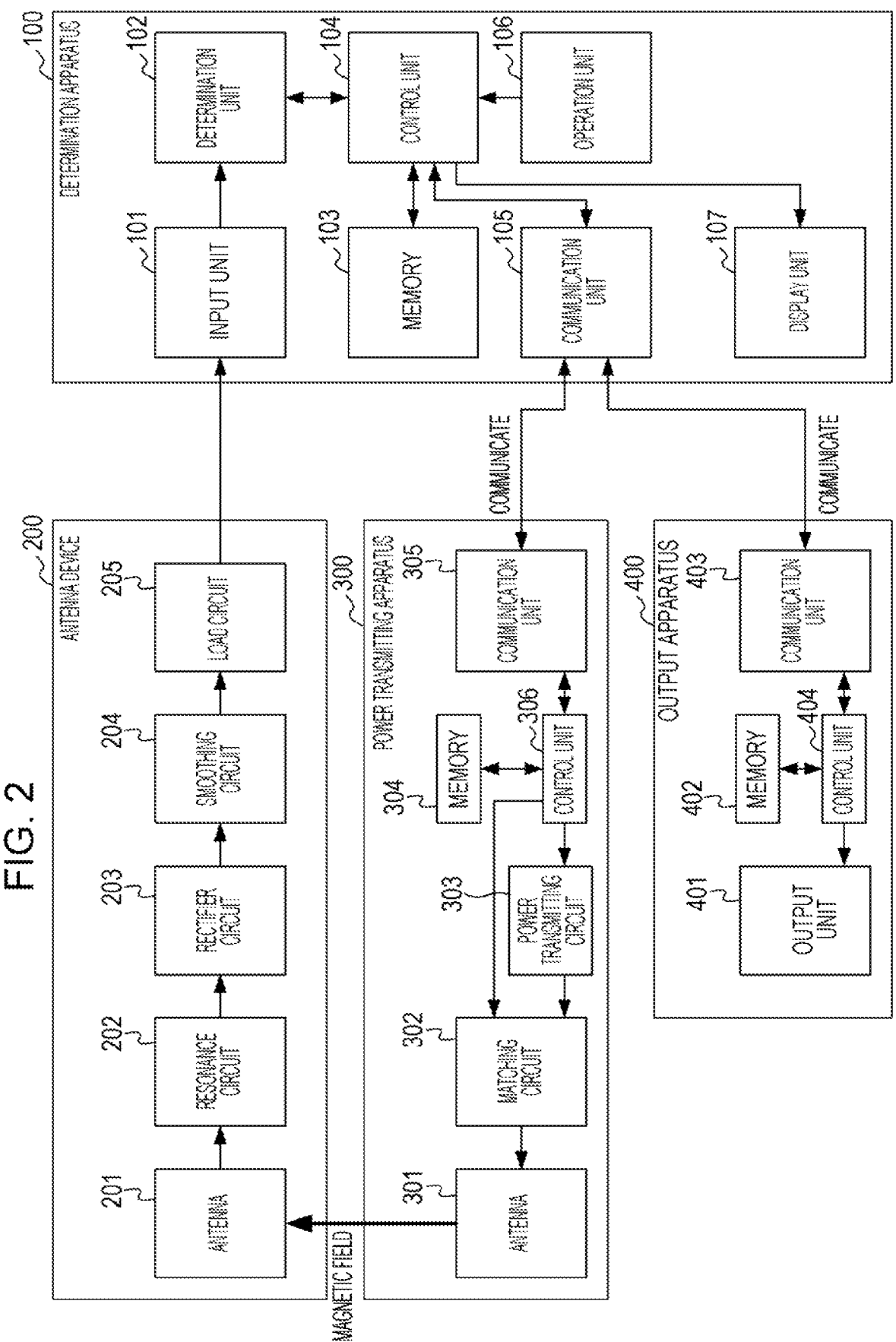
FIG. 2 illustrates examples of components of the determination system according to the first embodiment.

Next, examples of components of the determination apparatus 100 according to the first embodiment will be described with reference to FIG. 2. The determination apparatus 100 includes, for example, an input unit 101, a determination unit 102, a memory 103, a control unit 104, a communication unit 105, an operation unit 106, and a display unit 107.

The input unit 101 includes a connector for connecting the antenna device 200 and receives the magnetic field information from the antenna device 200 via the connector.

In order to move the position of the antenna device 200, the input unit 101 may further include a movable portion for moving the connector to which the antenna device 200 is connected. The input unit 101 may control the movable portion such that the antenna device 200 is moved to a position where the strength of magnetic field generated by the power transmitting apparatus 300 is maximized. The input unit 101 supplies the magnetic field information received from the antenna device 200 to the determination unit 102.

In accordance with an instruction from the control unit 104, the determination unit 102 determines whether the strength of magnetic field indicated by the magnetic field information supplied from the input unit 101 is not greater than the predetermined reference value. Note that the predetermined reference value is set by the control unit 104. The determination unit 102 supplies the determination information to the control unit 104. In addition, the determination unit 102 can determine whether the connector of the input unit 101 and the antenna device 200 are connected to each other.

The memory 103 stores a program executed by the control unit 104. In addition, the memory 103 stores information generated by the control unit 104 and information obtained by the control unit 104.

In accordance with the program stored in the memory 103, the control unit 104 controls the determination apparatus 100. The control unit 104 includes a hardware component such as a central processing unit (CPU) or a microprocessing unit (MPU). In accordance with an input signal that is input through the operation unit 106, the control unit 104 sets the predetermined reference value to be used by the determination unit 102.

In accordance with a predetermined communication standard, the communication unit 105 communicates with at least one of the power transmitting apparatus 300 and the output apparatus 400. The predetermined communication standard may be a communication standard related to wired communication (e.g., universal serial bus (USB)). The predetermined communication standard may also be a communication standard related to wireless communication (e.g., wireless local area network (LAN) standard, Bluetooth (registered trademark) standard, near field communication (NFC) standard, or TransferJet standard).

The operation unit 106 accepts a user operation as an input signal and supplies the input signal to the control unit 104. The operation unit 106 may include a touch panel and may include a button or switch for accepting a user operation.

The display unit 107 displays information supplied from the control unit 104. The display unit 107 includes a liquid crystal panel, for example.

Next, examples of components of the antenna device 200 according to the first embodiment will be described with reference to FIG. 2. The antenna device 200 includes, for example, an antenna 201, a resonance circuit 202, a rectifier circuit 203, a smoothing circuit 204, and a load circuit 205.

The antenna 201 receives the magnetic field generated by the power transmitting apparatus 300. The antenna 201 serves as at least one of ISO 10373-6 Reference PICC and NFC Forum Reference Listener. Note that the antenna 201 is a loop antenna.

If the antenna device 200 receives the magnetic field generated by the power transmitting apparatus 300, a voltage is generated in the antenna 201. The voltage generated in the antenna 201 is supplied to the rectifier circuit 203 through the resonance circuit 202.

The resonance circuit 202 adjusts a resonant frequency of the antenna device 200. In addition, the resonance circuit 202 includes at least one of a condenser that is connected in series to the antenna 201 and a condenser that is connected in parallel to the antenna 201. Furthermore, the resonance circuit 202 adjusts the capacitance of the condenser of the resonance circuit 202 in order to match the resonant frequency of the antenna device 200 with the resonant frequency of the power transmitting apparatus 300. The resonant frequency of the antenna device 200 is determined on the basis of the capacitance of the condenser included in the resonance circuit 202 and the inductance of the antenna 201.

The rectifier circuit 203 rectifies electromotive force supplied from the antenna 201. The rectifier circuit 203 includes a diode, a field-effect transistor (FET), or the like. The voltage that is rectified by the rectifier circuit 203 is supplied to the smoothing circuit 204.

The smoothing circuit 204 smoothes the voltage supplied from the rectifier circuit 203 and obtains a direct-current voltage. The smoothing circuit 204 includes a condenser or the like. The direct-current voltage obtained by the smoothing circuit 204 is supplied to the load circuit 205.

If the connector of the input unit 101 and the antenna device 200 are connected to each other, the load circuit 205 supplies the direct-current voltage supplied from the smoothing circuit 204 as the magnetic field information to the input unit 101. The load circuit 205 includes a resistor or the like.

Next, examples of components of the power transmitting apparatus 300 according to the first embodiment will be described with reference to FIG. 2. The power transmitting apparatus 300 includes, for example, an antenna 301, a matching circuit 302, a power transmitting circuit 303, a memory 304, a communication unit 305, and a control unit 306.

The antenna 301 is used for generating a magnetic field in order to transmit power wirelessly. The antenna 301 is a loop antenna.

The matching circuit 302 is a circuit for matching the impedance between the antenna 301 and the power transmitting circuit 303. The matching circuit 302 includes at least one of a condenser that is connected in series to the antenna 301, a condenser that is connected in parallel to the antenna 301, a coil that is connected in series to the antenna 301, and a coil that is connected in parallel to the antenna 301.

In accordance with an instruction from the control unit 306, the matching circuit 302 can adjust at least one of the capacitance of the matching circuit 302 and the inductance of the matching circuit 302.

In accordance with an instruction from the control unit 306, the power transmitting circuit 303 generates alternating-current power. The power transmitting circuit 303 supplies the generated alternating-current power to the antenna 301 through the matching circuit 302. The power transmitting circuit 303 includes at least one of a quartz crystal unit, a driver, and a switching circuit. In addition, the power transmitting circuit 303 includes a Class E amplifier and an inverter. The power transmitting circuit 303 may include a circuit that converts direct-current power to alternating-current power.

The memory 304 stores a program executed by the control unit 306. In addition, the memory 304 stores information generated by the control unit 306 and information obtained by the control unit 306.

In accordance with the same communication standard as the communication standard of the communication unit 105, the communication unit 305 communicates with the determination apparatus 100.

In accordance with the program stored in the memory 304, the control unit 306 controls the power transmitting apparatus 300. The control unit 306 includes a hardware component such as a CPU or an MPU.

The control unit 306 controls the matching circuit 302 such that at least one of the capacitance of the matching circuit 302 and the inductance of the matching circuit 302 is changed. In this case, the control unit 306 stores a parameter indicating at least one of the current capacitance of the matching circuit 302 and the current inductance of the matching circuit 302 in the memory 304 as a parameter of the matching circuit 302.

By changing at least one of the capacitance of the matching circuit 302 and the inductance of the matching circuit 302, the control unit 306 can change the strength of magnetic field generated in the antenna 301.

In addition, the control unit 306 controls the power transmitting circuit 303 so as to generate a predetermined level of alternating-current power. In this case, the control unit 306 stores, in the memory 304, a parameter indicating the value of alternating-current power currently generated by the power transmitting circuit 303 as a parameter of the power transmitting circuit 303. By changing the value of the alternating-current power generated by the power transmitting circuit 303, the control unit 306 can change the strength of magnetic field generated in the antenna 301.

The power transmitting apparatus 300 has a power transmission mode and a determination mode as operation modes. The power transmission mode is a mode for transmitting power to a power receiving apparatus that can receive power wirelessly from the power transmitting apparatus 300. The determination mode is a mode for measuring, by using the antenna device 200, the magnetic field generated by the power transmitting apparatus 300.

Next, examples of components of the output apparatus 400 according to the first embodiment will be described with reference to FIG. 2. The output apparatus 400 includes, for example, an output unit 401, a memory 402, a communication unit 403, and a control unit 404.

The output unit 401 notifies a user of determination information obtained from the determination apparatus 100 through the communication unit 403. The output unit 401 may be, for example, a printing unit that prints the determination information received from the determination apparatus 100 on a paper medium or a display unit that displays the determination information received from the determination apparatus 100 as image data.

The memory 402 stores a program executed by the control unit 404. In addition, the memory 402 stores information generated by the control unit 404 and information obtained by the control unit 404.

In accordance with the same communication standard as the communication standard of the communication unit 105, the communication unit 403 communicates with the determination apparatus 100. In addition, in accordance with the same communication standard as the communication standard of the communication unit 305, the communication unit 403 communicates with the power transmitting apparatus 300.

In accordance with the program stored in the memory 402, the control unit 404 controls the output apparatus 400. The control unit 404 includes a hardware component such as a CPU or an MPU.

If the communication unit 403 receives the determination information from the determination apparatus 100, the control unit 404 converts the determination information into data to be outputted from the output unit 401 and supplies the converted data to the output unit 401. Subsequently, the output unit 401 outputs the data supplied from the control unit 404 so as to notify a user of the determination information obtained from the determination apparatus 100.

Figure 3:
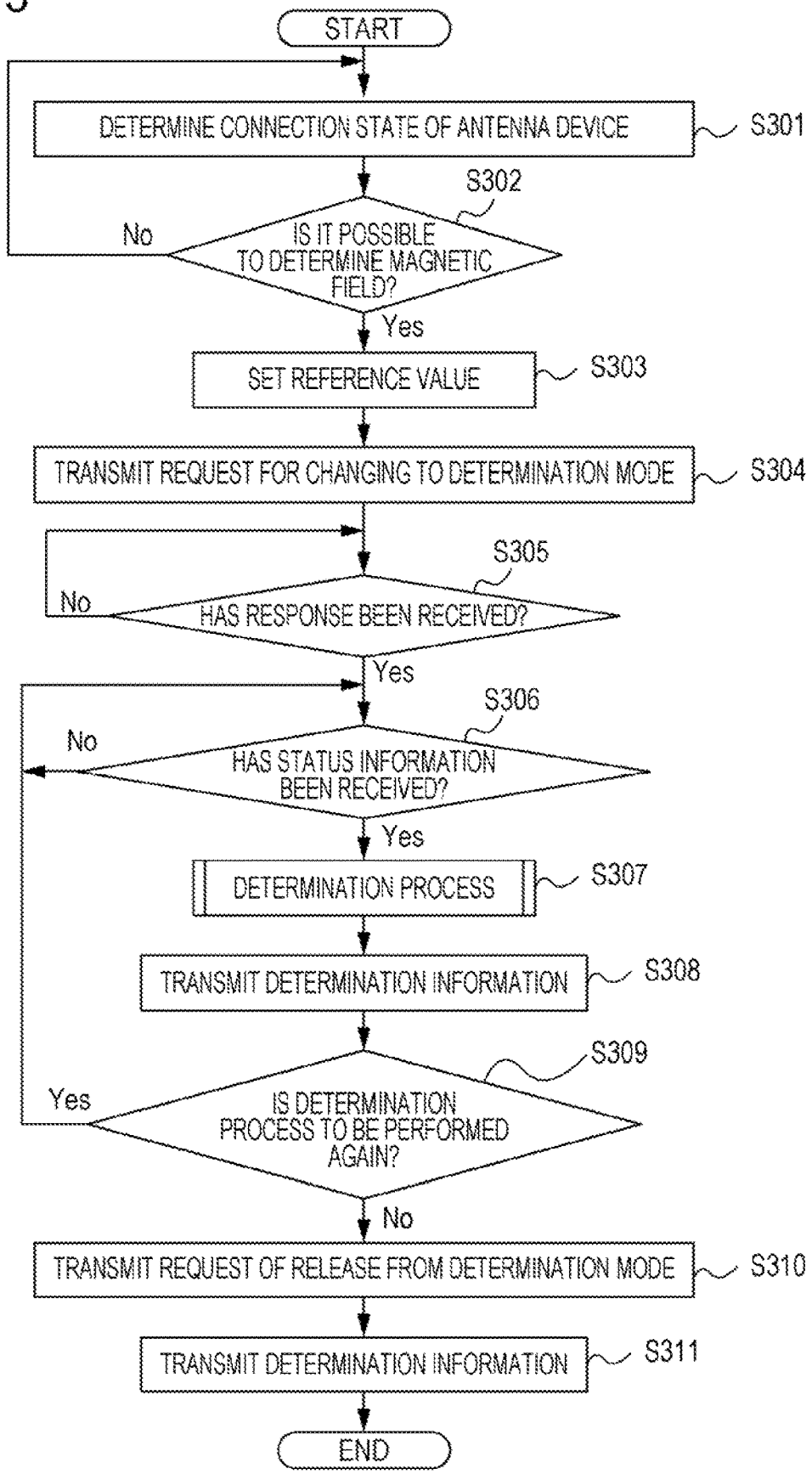
FIG. 3 is a flowchart illustrating an example of a transmission process according to the first embodiment.

Next, an example of a transmission process performed by the control unit 104 will be described with reference to FIG. 3. The transmission process in FIG. 3 can be performed by the control unit 104 executing a program stored in the memory 103. The transmission process in FIG. 3 is a process for transmitting determination information obtained by the determination apparatus 100.

In step S301, the control unit 104 controls the determination unit 102 so as to determine whether the connector of the input unit 101 and the antenna device 200 are connected to each other. Subsequently, the control unit 104 performs step S302.

In step S302, by using a determination result of the determination unit 102, the control unit 104 determines whether it is possible to determine the strength of magnetic field generated by the power transmitting apparatus 300. If the determination unit 102 determines that the connector of the input unit 101 and the antenna device 200 are connected to each other, the control unit 104 determines that it is possible to determine the strength of magnetic field generated by the power transmitting apparatus 300 (Yes in step S302). In this case (Yes in step S302), the control unit 104 performs step S303. If the determination unit 102 determines that the connector of the input unit 101 and the antenna device 200 are not connected to each other, the control unit 104 determines that it is not possible to determine the strength of magnetic field generated by the power transmitting apparatus 300 (No in step S302). In this case (No in step S302), the control unit 104 performs step S301.

In step S303, in accordance with an input signal that is input through the operation unit 106, the control unit 104 sets a predetermined reference value to be used for determining the strength of magnetic field. In the first embodiment, for example, an example in which the control unit 104 sets the predetermined reference value to "H1" will be described. Subsequently, the control unit 104 performs step S304.

In step S304, the control unit 104 controls the communication unit 105 so as to transmit, to the power transmitting apparatus 300, a command for requesting the power transmitting apparatus 300 to change the operation mode to the determination mode. Subsequently, the control unit 104 performs step S305. Hereinafter, the command for requesting the power transmitting apparatus 300 to change the operation mode to the determination mode will be referred to as "first command".

In step S305, the control unit 104 determines whether the communication unit 105 has received a response to the first command from the power transmitting apparatus 300. If the control unit 104 determines that the communication unit 105 has received a response to the first command (Yes in step S305), the control unit 104 performs step S306. If the control unit 104 determines that the communication unit 105 has not received a response to the first command (No in step S305), the control unit 104 repeatedly performs step S305.

In step S306, the control unit 104 determines whether the communication unit 105 has received status information from the power transmitting apparatus 300. The status information is information (power transmission status information) including a parameter of the matching circuit 302 and a parameter of the power transmitting circuit 303. If the control unit 104 determines that the communication unit 105 has received status information (Yes in step S306), the control unit 104 performs step S307. If the control unit 104 determines that the communication unit 105 has not received status information (No in step S306), the control unit 104 repeatedly performs step S306.

In step S307, the control unit 104 performs a determination process for determining whether the strength of magnetic field generated by the power transmitting apparatus 300 is not greater than the predetermined reference value. The determination process will be described later. Subsequently, the control unit 104 performs step S308. After performing the determination process, the control unit 104 generates determination information indicating a determination result as to whether the strength of magnetic field generated by the power transmitting apparatus 300 is not greater than the predetermined reference value. Subsequently, the control unit 104 stores, in the memory 103, the generated determination information in association with the status information received by the communication unit 105 in step S306.

Then, in step S308, the control unit 104 controls the communication unit 105 so as to transmit the determination information generated in step S307 to the power transmitting apparatus 300. Subsequently, the control unit 104 performs step S309. In step S308, the control unit 104 may further control the communication unit 105 so as to transmit the predetermined reference value that is set in step S303 to the power transmitting apparatus 300.

After the determination information has been transmitted to the power transmitting apparatus 300, in some cases, the power transmitting apparatus 300 transmits, to the determination apparatus 100, a command for requesting the determination apparatus 100 to perform the determination process in step S307 again. Hereinafter, the command for requesting the determination apparatus 100 to perform the determination process in step S307 again will be referred to as "second command".

In step S309, the control unit 104 determines whether it is necessary to perform the determination process in step S307 again. If the communication unit 105 receives the second command from the power transmitting apparatus 300, the control unit 104 determines that it is necessary to perform the determination process in step S307 again (Yes in step S309). In this case (Yes in step S309), the control unit 104 performs step S306. If the communication unit 105 does not receive the second command from the power transmitting apparatus 300, the control unit 104 determines that it is not necessary to perform the determination process in step S307 (No in step S309). In this case (No in step S309), the control unit 104 performs step S310.

In step S310, the control unit 104 controls the communication unit 105 to transmit, to the power transmitting apparatus 300, a command for requesting the operation mode of the power transmitting apparatus 300 to be released from the determination mode. Subsequently, the control unit 104 performs step S311. Hereinafter, the command for requesting the operation mode of the power transmitting apparatus 300 to be released from the determination mode will be referred to as "third command".

In step S311, the control unit 104 controls the communication unit 105 to transmit one or more pieces of determination information and the associated status information to the output apparatus 400. The determination information and status information are stored in the memory 103 through the process from step S306 to step S309. After performing step S311, the control unit 104 ends the transmission process. In step S311, the control unit 104 may further control the communication unit 105 so as to transmit the predetermined reference value that is set in step S303 to the output apparatus 400.

If step S311 is performed, the output apparatus 400 controls the output unit 401 so as to output the one or more pieces of determination information and associated status information received from the determination apparatus 100.

In addition, after performing the determination process in step S307, the control unit 104 may control the display unit 107 to display the determination information and the status information associated with the determination information.

After a fixed period has elapsed from the end of the transmission process, the control unit 104 may perform the transmission process in FIG. 3 again.

If the determination process in step S307 is to be performed again after the determination process in step S307 has been performed (Yes in step S309), without deleting the determination information that is already stored in the memory 103, the control unit 104 stores newly generated determination information in the memory 103 as other information.

Figure 4:
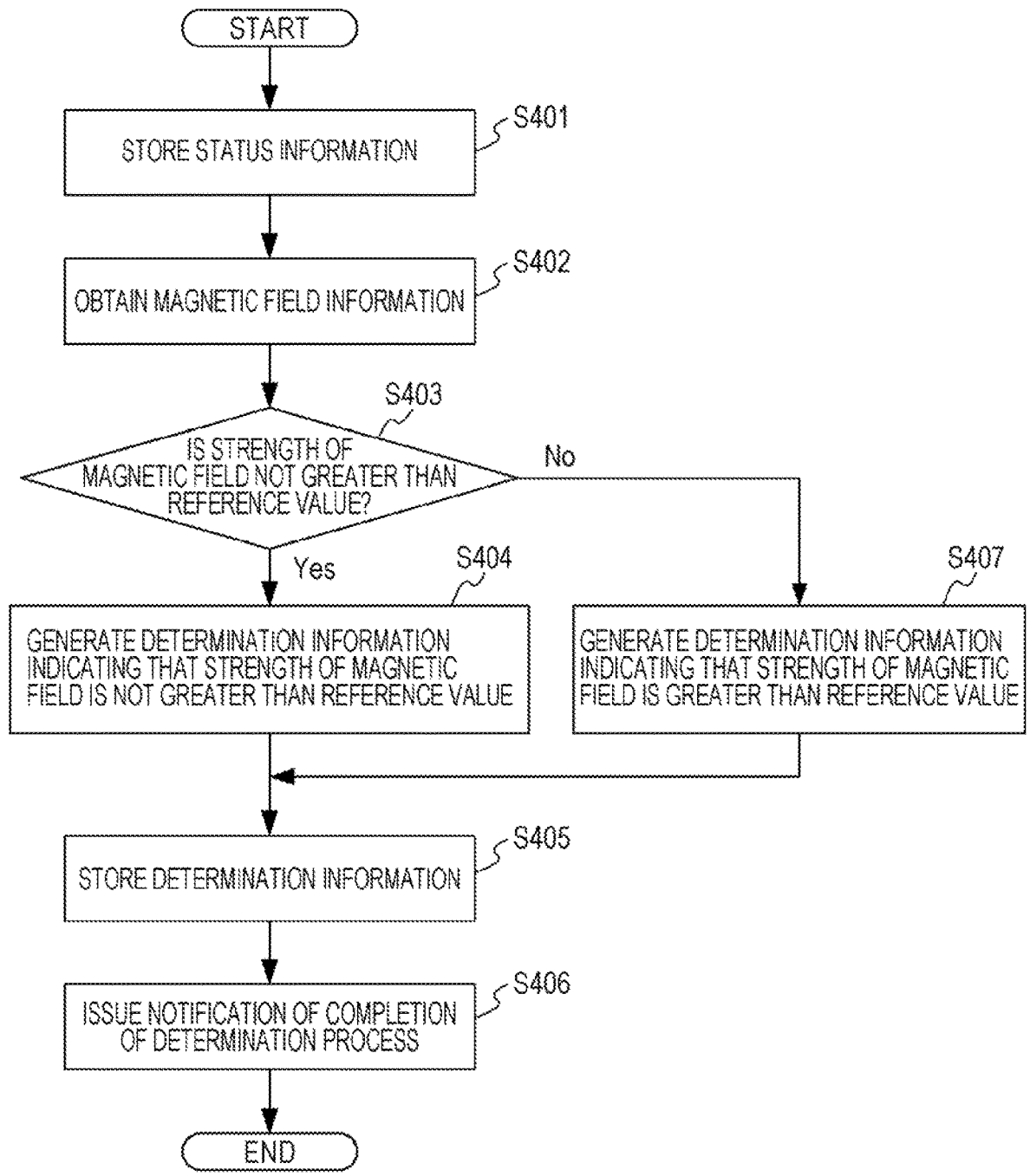
FIG. 4 is a flowchart illustrating an example of a determination process according to the first embodiment.

Next, an example of the determination process performed by the control unit 104 will be described with reference to FIG. 4. The determination process in FIG. 4 can be performed by the control unit 104 executing a program stored in the memory 103. The determination process in FIG. 4 is a process performed in step S307 in the transmission process in FIG. 3.

In step S401, the control unit 104 stores, in the memory 103, the status information that has been received by the communication unit 105 in step S306. If the status information is already stored in the memory 103, without deleting the stored status information, the control unit 104 stores the status information received by the communication unit 105 as other information in the memory 103. Subsequently, the control unit 104 performs step S402.

In step S402, the control unit 104 controls the determination unit 102 so as to obtain magnetic field information from the input unit 101. In addition, the control unit 104 controls the determination unit 102 so as to determine whether the strength of magnetic field is not greater than the predetermined reference value. From the magnetic field information obtained from the input unit 101, the determination unit 102 detects the strength of magnetic field. Subsequently, the determination unit 102 determines whether the detected strength of magnetic field is not greater than the predetermined reference value. The predetermined reference value used in step S403 is the value (e.g., H1) that is set by the control unit 104 in step S303. After performing step S402, the control unit 104 performs step S403.

In step S403, the control unit 104 determines whether the strength of magnetic field is not greater than the predetermined reference value. If the strength of magnetic field is not greater than the predetermined reference value (Yes in step S403), the control unit 104 performs step S404. If the strength of magnetic field is greater than the predetermined reference value (No in step S403), the control unit 104 performs step S407.

In step S404, the control unit 104 generates determination information indicating that the strength of magnetic field generated by the power transmitting apparatus 300 is not greater than the predetermined reference value. Subsequently, the control unit 104 performs step S405.

In step S405, the control unit 104 stores the determination information generated in step S404 or step S407 in the memory 103. In this case, the control unit 104 stores, in the memory 103, the determination information generated in step S404 or step S407 in association with the status information that is stored in the memory 103 in step S401. Subsequently, the control unit 104 performs step S406.

In step S406, the control unit 104 controls the communication unit 105 so as to transmit, to the power transmitting apparatus 300, a command for issuing a notification of completion of the determination process. After performing step S406, the control unit 104 completes the determination process and performs step S308 in FIG. 3. Hereinafter, the command for issuing a notification of completion of the determination process will be referred to as "fourth command".

In step S407, the control unit 104 generates determination information indicating that the strength of magnetic field generated by the power transmitting apparatus 300 is greater than the predetermined reference value. Subsequently, the control unit 104 performs step S405. Note that, in step S407, the control unit 104 may generate determination information indicating that the strength of magnetic field generated by the power transmitting apparatus 300 is not equal to or lower than the predetermined reference value.

Figure 5:
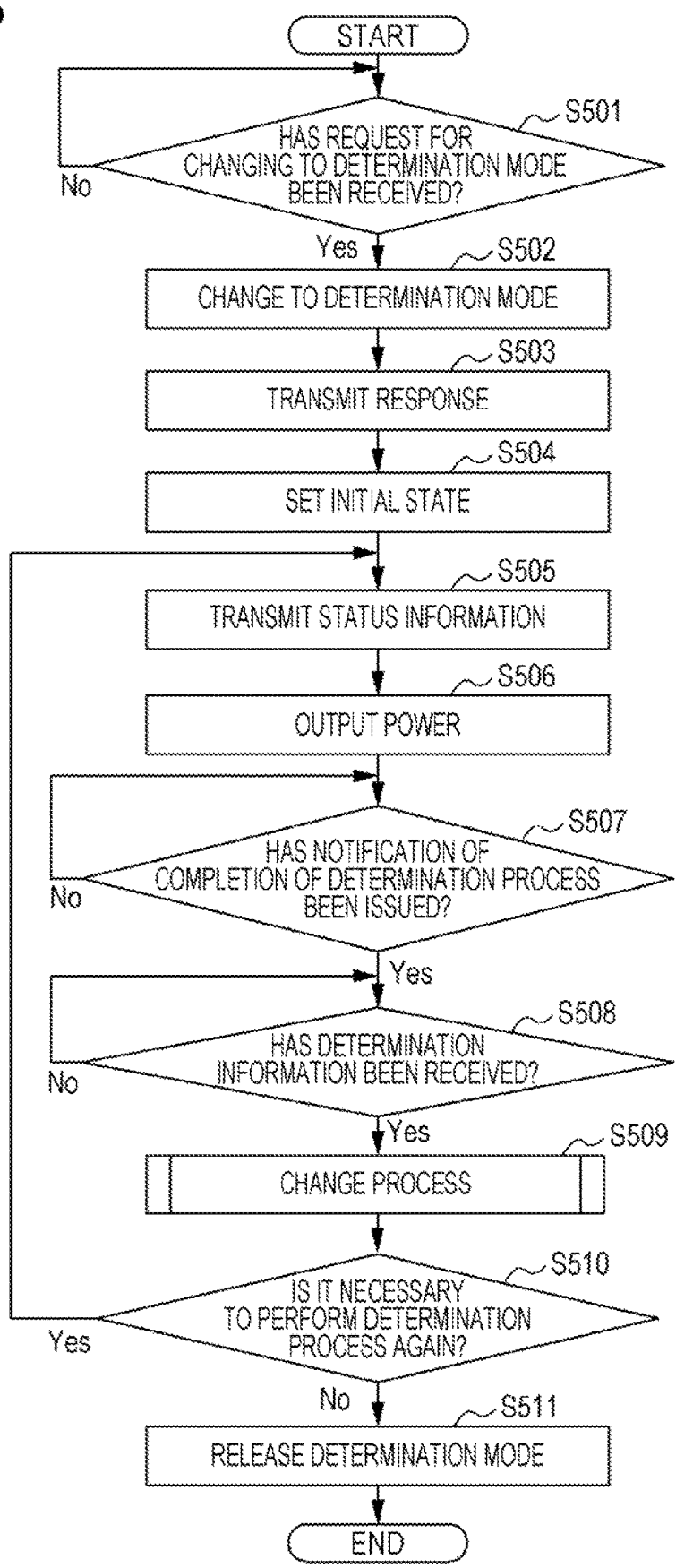
FIG. 5 is a flowchart illustrating an example of a determination preparation process according to the first embodiment.

Next, an example of a determination preparation process performed by the control unit 306 will be described with reference to FIG. 5. The determination preparation process in FIG. 5 can be performed by the control unit 306 executing a program stored in the memory 304. The determination preparation process in FIG. 5 is performed in the power transmitting apparatus 300 in order to cause the determination apparatus 100 to obtain determination information.

In step S501, the control unit 306 determines whether the communication unit 305 has received the first command from the determination apparatus 100. If the control unit 306 determines that the communication unit 305 has received the first command from the determination apparatus 100 (Yes in step S501), the control unit 306 performs step S502. If the control unit 306 determines that the communication unit 305 has not received the first command from the determination apparatus 100 (No in step S501), the control unit 306 repeatedly performs step S501.

In step S502, the control unit 306 changes the operation mode of the power transmitting apparatus 300 to the determination mode. Subsequently, the control unit 306 performs step S503.

In step S503, the control unit 306 controls the communication unit 305 so as to transmit a response to the first command to the determination apparatus 100. Subsequently, the control unit 306 performs step S504.

In step S504, the control unit 306 sets the power transmitting apparatus 300 to an initial state. The initial state is, for example, a state in which the capacitance of the matching circuit 302 and the inductance of the matching circuit 302 are minimized, and in which the power generated by the power transmitting circuit 303 is maximized. Subsequently, the control unit 306 performs step S505.

In step S505, the control unit 306 generates status information and controls the communication unit 305 to transmit the generated status information to the determination apparatus 100. Subsequently, the control unit 306 performs step S506.

In a case where step S505 is performed after step S504 has been performed, the status information generated by the control unit 306 includes information indicating that the capacitance of the matching circuit 302 and the inductance of the matching circuit 302 are minimized. In addition, the status information also includes information indicating that the power generated by the power transmitting circuit 303 is maximized.

In a case where step S505 is performed after step S509 has been performed, the status information generated by the control unit 306 includes information indicating the capacitance of the matching circuit 302 and/or the inductance of the matching circuit 302 changed in step S509. In addition, the status information also includes information indicating the power generated by the power transmitting circuit 303 changed in step S509.

In step S506, the control unit 306 controls the power transmitting circuit 303 so as to output power through the antenna 301. Subsequently, the control unit 306 performs step S507.

In step S507, the control unit 306 determines whether the communication unit 305 has received the fourth command from the determination apparatus 100. If the control unit 306 determines that the communication unit 305 has received the fourth command from the determination apparatus 100 (Yes in step S507), the control unit 306 performs step S508. In this case (Yes in step S507), the control unit 306 controls the power transmitting circuit 303 to reduce power to be output from the antenna 301. In addition, in this case (Yes in step S507), the control unit 306 may control the power transmitting circuit 303 so as to stop outputting power from the antenna 301.

If the control unit 306 determines that the communication unit 305 has not received the fourth command from the determination apparatus 100 (No in step S507), the control unit 306 repeatedly performs step S507.

In step S508, the control unit 306 determines whether the communication unit 305 has received determination information from the determination apparatus 100. If the control unit 306 determines that the communication unit 305 has received the determination information from the determination apparatus 100 (Yes in step S508), the control unit 306 performs step S509. If the control unit 306 determines that the communication unit 305 has not received the determination information from the determination apparatus 100 (No in step S508), the control unit 306 repeatedly performs step S508.

In step S509, the control unit 306 performs a change process in accordance with the determination information received by the communication unit 305 in step S508. The change process includes a process for changing a state of the power transmitting apparatus 300 and a process for determining whether it is necessary to cause the determination apparatus 100 to perform the determination process in step S307. The change process will be described later. Subsequently, the control unit 306 performs step S510.

In step S510, in accordance with a result of the change process performed in step S509, the control unit 306 determines whether it is necessary to cause the determination apparatus 100 to perform the determination process in step S307 again. If the control unit 306 determines that it is necessary to cause the determination apparatus 100 to perform the determination process in step S307 again (Yes in step S510), the control unit 306 controls the communication unit 305 to transmit the second command to the determination apparatus 100. In this case (Yes in step S510), the control unit 306 returns to step S505.

If the control unit 306 determines that it is not necessary to cause the determination apparatus 100 to perform the determination process in step S307 again (No in step S510), the control unit 306 performs step S511.

In step S511, the control unit 306 releases the operation mode of the power transmitting apparatus 300 from the determination mode. For example, in step S511, the control unit 306 returns the operation mode of the power transmitting apparatus 300 to a mode that is set before changing to the determination mode. After step S511 has been performed, the control unit 306 ends the determination preparation process in FIG. 5.

After a fixed period has elapsed from the end of the determination preparation process, the control unit 306 may perform the determination preparation process in FIG. 5 again.

In the above example, if the control unit 306 determines that the communication unit 305 has received the fourth command (Yes in step S507), the control unit 306 controls the power transmitting circuit 303 to reduce power to be output from the antenna 301. However, the control of the power transmitting circuit 303 is not limited to the above example. After a fixed period has elapsed from when power was started to be output from the antenna 301, the control unit 306 may control the power transmitting circuit 303 so as to reduce power to be output from the antenna 301. In addition, after a fixed period has elapsed from when power was started to be output from the antenna 301, the control unit 306 may control the power transmitting circuit 303 so as to stop outputting power from the antenna 301.

Next, an example of the change process performed by the control unit 306 will be described with reference to FIG. 6. The change process in FIG. 6 can be performed by the control unit 306 executing a program stored in the memory 304. The change process in FIG. 6 is performed in step S509 in the determination preparation process in FIG. 5.

In step S601, the control unit 306 determines whether the strength of magnetic field measured by the antenna device 200 is not greater than the predetermined reference value by using the determination information received by the communication unit 305 in step S508. If the determination information indicates that the strength of magnetic field generated by the power transmitting apparatus 300 is not greater than the predetermined reference value, the control unit 306 determines that the strength of magnetic field measured by the antenna device 200 is not greater than the predetermined reference value (Yes in step S601). In this case (Yes in step S601), the control unit 306 performs step S602. If the determination information indicates that the strength of magnetic field generated by the power transmitting apparatus 300 is greater than the predetermined reference value, the control unit 306 determines that the strength of magnetic field measured by the antenna device 200 is greater than the predetermined reference value (No in step S601). In this case (No in step S601), the control unit 306 performs step S604.

In step S602, the control unit 306 controls the matching circuit 302 so as to change a parameter of the matching circuit 302 to a parameter that is set when the determination apparatus 100 does not perform the determination process.

For example, the control unit 306 controls the matching circuit 302 so as to change at least one of the current capacitance of the matching circuit 302 and the current inductance of the matching circuit 302. Subsequently, the control unit 306 performs step S603.

In step S603, the control unit 306 changes a parameter of the power transmitting circuit 303 such that power generated by the power transmitting circuit 303 is maximized with the current parameters of the matching circuit 302. Subsequently, the control unit 306 performs step S604.

In step S604, the control unit 306 determines whether any of conditions of all combinations of parameters of the matching circuit 302 and parameters of the power transmitting circuit 303 is yet to be subjected to the determination process performed by the determination apparatus 100. If the control unit 306 determines that any of conditions of all combinations of parameters of the matching circuit 302 and parameters of the power transmitting circuit 303 is yet to be subjected to the determination process performed by the determination apparatus 100 (Yes in step S604), the control unit 306 performs step S605.

If the control unit 306 determines that all combinations of parameters of the matching circuit 302 and parameters of the power transmitting circuit 303 have been subjected to the determination process performed by the determination apparatus 100 (No in step S604), the control unit 306 performs step S608.

In step S605, the control unit 306 determines that it is necessary to cause the determination apparatus 100 to perform the determination process in step S307 again. Subsequently, the control unit 306 ends the change process in FIG. 6 and performs step S510.

In step S606, the control unit 306 sets an unavailable parameter in the memory 304. The unavailable parameter is a parameter that is prohibited from being used by the power transmitting apparatus 300 if the power transmitting apparatus 300 is set to the power transmission mode. The unavailable parameter is any of the parameters of the matching circuit 302 and the parameters of the power transmitting circuit 303 that are set if the determination information indicating that the strength of magnetic field is greater than the predetermined reference value has been received from the determination apparatus 100. If the power transmitting apparatus 300 is changed to the power transmission mode after the unavailable parameter has been set in the memory 304, the control unit 306 controls the power transmitting circuit 303 and the matching circuit 302 by using parameters other than the unavailable parameter. After step S606 has been performed, the control unit 306 performs step S607.

In step S607, the control unit 306 changes a parameter of the power transmitting circuit 303 such that power generated by the power transmitting circuit 303 is reduced by a predetermined amount with the current parameters of the matching circuit 302. Subsequently, the control unit 306 performs step S604.

In step S608, the control unit 306 determines that it is not necessary to cause the determination apparatus 100 to perform the determination process in step S307 again. Subsequently, the control unit 306 ends the change process in FIG. 6 and performs step S510.

In the first embodiment, if the determination apparatus 100 has transmitted the determination information to the power transmitting apparatus 300, the power transmitting apparatus 300 can automatically change at least one of the parameters of the matching circuit 302 and the parameters of the power transmitting circuit 303 and can request the determination apparatus 100 to perform the determination process. Thus, the power transmitting apparatus 300 can cause the determination apparatus 100 to perform the determination process for all combinations of the parameters of the matching circuit 302 and the parameters of the power transmitting circuit 303. This makes it easier to determine whether the strength of magnetic field generated by the power transmitting apparatus 300 is not greater than the predetermined reference value.

Second Embodiment

Various functions, processes, or methods described in the first embodiment may also be realized by a personal computer, a microcomputer, a CPU, or the like using a program. In a second embodiment described below, the personal computer, microcomputer, CPU, or the like will be referred to as "computer X". In addition, in the second embodiment, a program for controlling the computer X and for realizing various functions, processes, or methods described in the first embodiment will be referred to as "program Y".

Various functions, processes, or methods described in the first embodiment are realized by the computer X executing the program Y. In this case, the program Y is supplied to the computer X via a computer readable storage medium. The computer readable storage medium in the second embodiment includes at least one of a hard disk device, a magnetic storage device, an optical storage device, a magneto-optical storage device, a memory card, a volatile memory, a non-volatile memory, or the like. The computer readable storage medium in the second embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all modifications and equivalent structures.

This application claims priority from Japanese Patent Application No. 2018-216896, filed Nov. 19, 2018, which is hereby incorporated by reference herein in its entirety.

What is claimed is:

1. A determination apparatus comprising:
a receiving unit that receives, from an antenna device, magnetic field information concerning a magnetic field generated by a power transmitting apparatus,
wherein
the power transmitting apparatus is configured to transmit power wirelessly to a power receiving apparatus,
the antenna device is configured to receive a magnetic field generated by the power transmitting apparatus, and
the magnetic field information received by the receiving unit from the antenna device indicates a strength of the magnetic field received by the antenna device from the power transmitting apparatus;
a determination unit that performs a determination process for determining whether the strength of the received magnetic field indicated by the magnetic field information is not greater than a predetermined reference value; and
a communication unit that transmits result data indicating a result of the determination process to the power transmitting apparatus or another apparatus.

2. The determination apparatus according to claim 1, wherein the determination apparatus receives information regarding a power transmission state of the power transmitting apparatus from the power transmitting apparatus before the determination process is performed.

3. The determination apparatus according to claim 2, wherein the received information regarding a power transmission state of the power transmitting apparatus comprises one or more parameters that the power transmitting apparatus is able to change to control the strength of the magnetic field generated by the power transmitting apparatus.

4. The determination apparatus according to claim 2, wherein the power transmission state information is received from the power transmitting apparatus, after the determination apparatus sends a command for requesting the power transmitting apparatus to change an operation mode of the power transmitting apparatus to a determination mode, and before the determination apparatus performs the determination process.

5. The determination apparatus according to claim 1, further comprising an accepting unit that accepts information to be used for setting the predetermined reference value.

6. The determination apparatus according to claim 1, wherein an antenna included in the antenna device functions as at least one of ISO 10373-6 Reference PICC or NFC Forum Reference Listener.

7. The determination apparatus according to claim 1, wherein
the power transmitting apparatus has a power transmission mode and a determination mode as operation modes,
the power transmission mode is a mode for transmitting power to a power receiving apparatus that can receive power wirelessly from the power transmitting apparatus, and
the determination mode is a mode for measuring, by using the antenna device, the magnetic field generated by the power transmitting apparatus.

8. The determination apparatus according to claim 7, wherein the determination apparatus controls the communication unit so as to transmit, to the power transmitting apparatus, a command for requesting the power transmitting apparatus to change an operation mode of the power transmitting apparatus to the determination mode.

9. The determination apparatus according to claim 7, wherein after the result data has been transmitted to the power transmitting apparatus, the communication unit transmits, to the power transmitting apparatus, a command for requesting the operation mode of the power transmitting apparatus to be released from the determination mode.

10. The determination apparatus according to claim 1, wherein
the communication unit further transmits the predetermined reference value to the power transmitting apparatus in a case where the result data is transmitted to the power transmitting apparatus, and
the communication unit further transmits the predetermined reference value and/or the power transmission state information to the another apparatus in a case where the result data is transmitted to the another apparatus.

11. The determination apparatus according to claim 1, wherein
the receiving unit includes a connector for connecting the determination apparatus to the antenna device, and
the receiving unit receives the magnetic field information from the antenna device via the connector.

12. The determination apparatus according to claim 11, wherein the receiving unit includes a movable portion for moving the connector to which the antenna device is to be connected, the movable portion controlled by the receiving unit such that the antenna device is moved to a position where the strength of the magnetic field received by the antenna device from the power transmitting apparatus is maximized.

13. The determination apparatus according to claim 1, wherein the communication unit further transmits information for controlling the power transmitting apparatus to the power transmitting apparatus based on the result of the determination process.

14. A method comprising:
receiving, from an antenna device, magnetic field information concerning a magnetic field generated by a power transmitting apparatus,
wherein
the power transmitting apparatus is configured to transmit power wirelessly to a power receiving apparatus,
the antenna device is configured to receive a magnetic field generated by the power transmitting apparatus, and
the magnetic field information received from the antenna device indicates a strength of the magnetic field received by the antenna device from the power transmitting apparatus;
performing a determination process for determining whether the strength of the received magnetic field indicated by the magnetic field information is not greater than a predetermined reference value; and
transmitting data indicating a result of the determination process to the power transmitting apparatus or another apparatus.

15. A non-transitory storage medium storing a program that causes a computer to execute a method, the method comprising:
receiving, from an antenna device, magnetic field information concerning a magnetic field generated by a power transmitting apparatus,
wherein
the power transmitting apparatus is configured to transmit power wirelessly to a power receiving apparatus,
the antenna device is configured to receive a magnetic field generated by the power transmitting apparatus, and
the magnetic field information received from the antenna device indicates a strength of the magnetic field received by the antenna device from the power transmitting apparatus;
performing a determination process for determining whether the strength of the received magnetic field indicated by the magnetic field information is not greater than a predetermined reference value; and
transmitting data indicating a result of the determination process to the power transmitting apparatus or another apparatus.

* * * * *